(12) United States Patent
Park et al.

(10) Patent No.: US 12,517,531 B2
(45) Date of Patent: Jan. 6, 2026

(54) ROBOT AND CONTROLLING METHOD THEREOF

(71) Applicant: SAMSUNG ELECTRONICS CO., LTD., Suwon-si (KR)

(72) Inventors: Dongwoo Park, Suwon-si (KR); Boseok Moon, Suwon-si (KR); Youngdae Ko, Suwon-si (KR); Junggap Kuk, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 84 days.

(21) Appl. No.: 18/409,516

(22) Filed: Jan. 10, 2024

(65) Prior Publication Data

US 2024/0241527 A1 Jul. 18, 2024

Related U.S. Application Data

(63) Continuation of application No. PCT/KR2023/019355, filed on Nov. 28, 2023.

(30) Foreign Application Priority Data

Jan. 18, 2023 (KR) .................. 10-2023-0007223

(51) Int. Cl.
  *G05D 13/02* (2006.01)
  *B62K 11/00* (2006.01)
(52) U.S. Cl.
  CPC ............ *G05D 13/02* (2013.01); *B62K 11/007* (2016.11)
(58) Field of Classification Search
  CPC ......... G05D 13/02; G05D 1/00; B62K 11/007
  (Continued)

(56) References Cited

U.S. PATENT DOCUMENTS

| 5,323,867 A | * | 6/1994 | Griffin | ................. B25J 11/0025 180/22 |
| 6,076,025 A | * | 6/2000 | Ueno | ................... G05D 1/0238 701/25 |

(Continued)

FOREIGN PATENT DOCUMENTS

| JP | 2002-323926 A | 11/2002 |
| JP | 5306474 B2 | 10/2013 |

(Continued)

OTHER PUBLICATIONS

Sangtae Kim et al., "Nonlinear Optimal Control Design for Underactuated Two-Wheeled Inverted Pendulum Mobile Platform," IEEE/ASME Transactions on Mechatronics, vol. 22, No. 6, Dec. 2017, pp. 2803-2808.

(Continued)

*Primary Examiner* — Logan M Kraft
*Assistant Examiner* — Anthony Donald Taylor, Jr.
(74) *Attorney, Agent, or Firm* — Sughrue Mion, PLLC

(57) ABSTRACT

An electronic device includes a driving part including a first driving wheel and a second driving wheel; a memory storing at least one instruction; and at least one processor operatively coupled with the driving part and the memory, wherein the at least one processor is configured to execute the at least one instruction to: based on detecting an occurrence of an event for stopping the robot while the first driving wheel rotates at a first speed and the second driving wheel rotates at a second speed, control the driving part to stop the robot based on the first speed and the second speed, and wherein the at least one processor may be further configured to execute the at least one instruction to control the driving part to stop the robot by: based on a relation between the first speed and the second speed satisfying a first condition, controlling the driving part such that a proceeding axis of the first driving wheel rotates in a first direction and (Continued)

a proceeding axis of the second driving wheel rotates in a second direction opposite to the first direction, and based on the relation between the first speed and the second speed satisfying a second condition, controlling the driving part such that the first driving wheel and the second driving wheel rotate in different directions at a same speed.

20 Claims, 14 Drawing Sheets

(58) Field of Classification Search
USPC .......................................................... 701/70
See application file for complete search history.

(56) References Cited

U.S. PATENT DOCUMENTS

| | | | |
|---|---|---|---|
| 8,577,516 B2* | 11/2013 | Takenaka | B62K 11/007 |
| | | | 701/1 |
| 10,800,049 B2 | 10/2020 | Neville et al. | |
| 11,112,803 B2 | 9/2021 | Kitano et al. | |
| 11,247,723 B2 | 2/2022 | Manji | |
| 11,806,288 B2 | 11/2023 | Lonner et al. | |
| 11,858,531 B2 | 1/2024 | Park et al. | |
| 2010/0230919 A1* | 9/2010 | Kawada | G01S 17/931 |
| | | | 367/118 |
| 2011/0191013 A1* | 8/2011 | Leeser | H02K 7/116 |
| | | | 180/10 |
| 2019/0255716 A1* | 8/2019 | Neville | B25J 19/002 |
| 2021/0121343 A1* | 4/2021 | Lonner | B25J 11/009 |
| 2021/0371037 A1* | 12/2021 | Ozaki | B60L 15/2036 |

FOREIGN PATENT DOCUMENTS

| | | | | |
|---|---|---|---|---|
| JP | 2019-171907 A | | 10/2019 | |
| JP | 2019171905 A | * | 10/2019 | ........... B60G 17/015 |
| JP | 2021-187349 A | | 12/2021 | |
| KR | 10-1997-0070566 A | | 11/1997 | |
| KR | 10-2016-0072576 A | | 6/2016 | |
| KR | 10-2021-0062297 A | | 5/2021 | |
| KR | 20210062297 A | * | 5/2021 | ............ B60K 17/34 |
| WO | 2019/164599 A1 | | 8/2019 | |

OTHER PUBLICATIONS

Sangtae Kim et al., "Dynamic Modeling of a Two-wheeled Inverted Pendulum Balancing Mobile Robot," International Journal of Control, Automation, and Systems, May 23, 2015, pp. 926-933.
International Search Report (PCT/ISA/210) issued on Mar. 14, 2024 by the International Searching Authority in International Application No. PCT/KR2023/019355.
Written Opinion (PCT/ISA/237) issued on Mar. 14, 2024 by the International Searching Authority in International Application No. PCT/KR2023/019355.

* cited by examiner

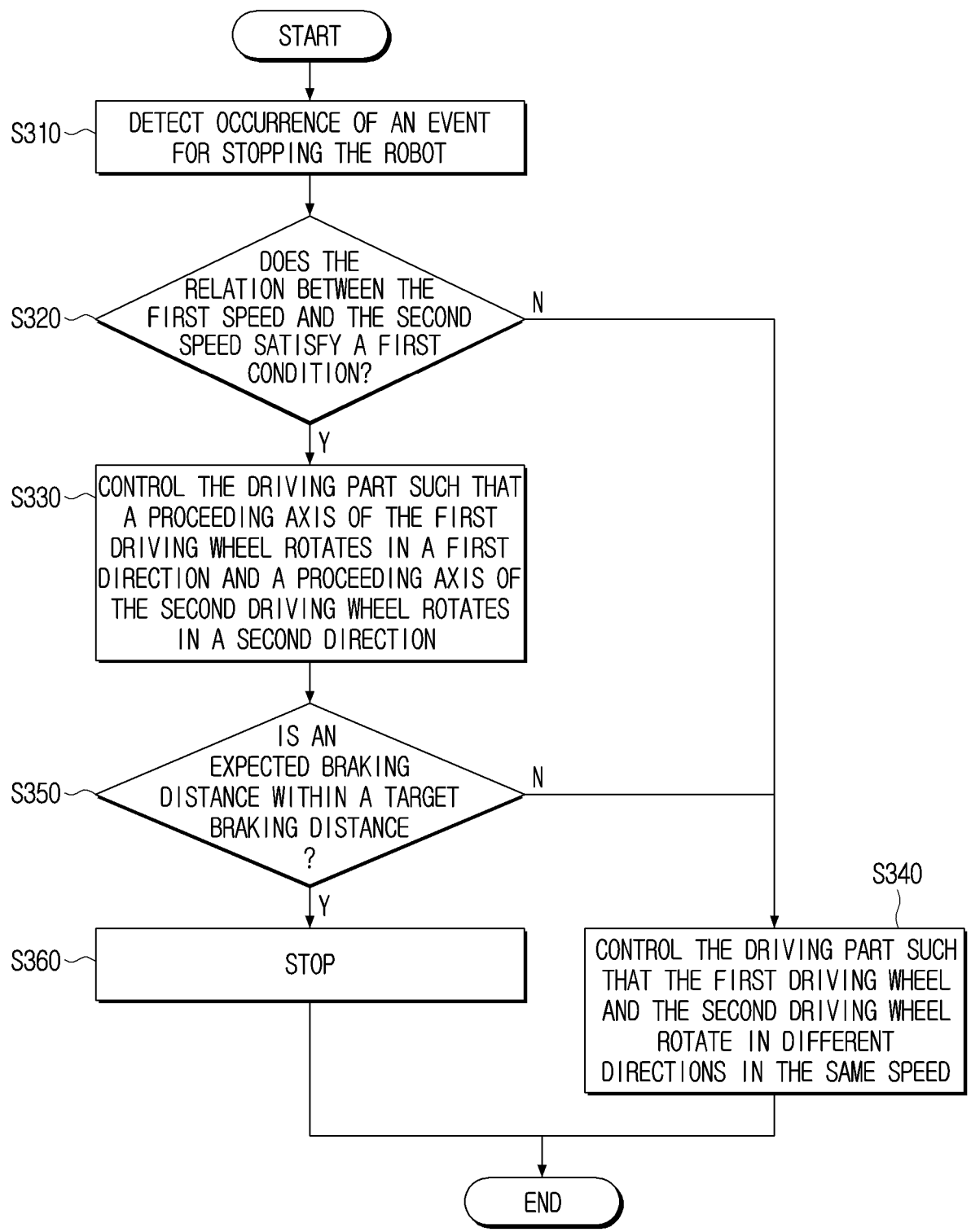

ROBOT AND CONTROLLING METHOD THEREOF

CROSS-REFERENCE TO RELATED APPLICATION(S)

This application is a bypass continuation of International Application No. PCT/KR2023/019355, filed on Nov. 28, 2023, which is based on and claims priority to Korean Patent Application No. 10-2023-0007223, filed on Jan. 18, 2023, in the Korean Intellectual Property Office, the disclosures of which are incorporated by reference herein in their entireties.

BACKGROUND

1. Field

The disclosure relates to a robot and a controlling method thereof, and more particularly, to a robot that stops while driving, and a controlling method thereof.

2. Description of Related Art

A driving robot is a device that performs a job while automatically driving in an area to be driven without a user's manipulation. Recently, mobile robots are utilized in various fields as sensors and controllers have developed, and as examples thereof, there may be a cleaning robot, a telepresence robot, a security robot, etc.

Here, a driving robot may control the driving and stopping of the robot by controlling the balance of the robot by using an inverted pendulum.

FIG. 1A and FIG. 1B are perspective views of a related art robot 10. In a robot based on an inverted pendulum, a torque generated by a driving motor of a driving wheel and a torque applied to a pendulum at the time of braking may have the same sizes, but their directions may be opposite.

Referring to FIG. 1A, in the case of the robot 10 based on an inverted pendulum, if a torque in a (−) direction is generated in the driving wheel 11 by the driving motor for braking, a torque in a (+) direction is generated in the pendulum 12, and the pitch angle 13 of the robot may be changed in the (+) direction. Here, the pitch angle of the robot may be an angle indicating a vertical direction of the robot based on the ground surface.

In case the pitch angle exceeds the limit angle, the balance control function of the robot may be lost, and the robot may fall on the ground, and thus the robot may have to perform an operation for compensating the pitch angle for controlling the balance of the robot.

That is, in a situation wherein sudden braking is used, for compensating the pitch angle in the (+) direction generated at the time of braking, the robot 10 may have to perform a braking preparing operation of rotating or moving the body of the robot 10 to change the pitch angle 14 of the robot before braking to the (−) direction, as illustrated in FIG. 1B. Accordingly, the pitch angle of the robot 10 after braking may be 0 or smaller than or equal to the limit angle.

In this case, the robot 10 has to perform a preparing operation process for braking at the time of sudden braking, and accordingly, there is a problem that the braking distance and the braking time become long.

FIG. 1C is a plan view of the related art robot 10. Referring to FIG. 1C, the robot 10 may generate a torque in the (−) direction in the driving wheel 11a, 11b by the driving motor for braking. Accordingly, the robot 10 may decelerate and brake the robot 10 by using force 12a, 12b generated in a parallel direction to the proceeding axis of the driving wheel 11a, 11b.

Here, in the case of braking the robot 10 by using only the force 12a, 12b generated in a parallel direction to the proceeding axis of the driving wheel 11a, 11b, there is a problem that the braking distance and the braking time become long.

SUMMARY

According to an aspect of the disclosure, a robot includes: a driving part including a first driving wheel and a second driving wheel: a memory storing at least one instruction; and at least one processor operatively coupled with the driving part and the memory, wherein the at least one processor is configured to execute the at least one instruction to: based on detecting an occurrence of an event for stopping the robot while the first driving wheel rotates at a first speed and the second driving wheel rotates at a second speed, control the driving part to stop the robot based on the first speed and the second speed, and wherein the at least one processor may be further configured to execute the at least one instruction to control the driving part to stop the robot by: based on a relation between the first speed and the second speed satisfying a first condition, controlling the driving part such that a proceeding axis of the first driving wheel rotates in a first direction and a proceeding axis of the second driving wheel rotates in a second direction opposite to the first direction, and based on the relation between the first speed and the second speed satisfying a second condition, controlling the driving part such that the first driving wheel and the second driving wheel rotate in different directions at a same speed.

The at least one processor may be further configured to execute the at least one instruction to: on an xy plane wherein an x axis indicates the rotation speed of the first driving wheel and a y axis indicates the rotation speed of the second driving wheel, calculate a first distance, a second distance, and a third distance based on a first coordinate value on a point corresponding to the first speed and the second speed, based on the first distance being greater than a sum of the second distance and the third distance, identify that the relation between the first speed and the second speed satisfies the first condition, and based on the first distance being smaller than or equal to the sum of the second distance and the third distance, identify that the relation between the first speed and the second speed satisfies the second condition, the first distance is a distance between a first point and y=−x, the second distance is calculated by applying a predetermined weight to a distance between a second point wherein the first point is moved to the x axis or the y axis and adjoins y=x and the first point, and the third distance is calculated by applying a predetermined weight to a distance between the second point and a starting point.

The first driving wheel is on a left side of the robot, and the second driving wheel is on a right side of the robot, and the at least one processor may be further configured to execute the at least one instruction to, based on the relation between the first speed and the second speed satisfying the first condition, control the driving part such that the proceeding axis of the first driving wheel rotates by a first angle in a clockwise direction, and the proceeding axis of the second driving wheel rotates by a second angle in a counterclockwise direction.

The at least one processor may be further configured to execute the at least one instruction to acquire the first angle and the second angle based on the first speed and the second speed.

The at least one processor may be further configured to execute the at least one instruction to: based on the relation between the first speed and the second speed satisfying the first condition, identify whether an expected braking distance of the robot is within a target braking distance, and based on the expected braking distance of the robot being within the target braking distance, control the driving part such that rotation speeds of the first driving wheel and the second driving wheel decelerate.

The at least one processor may be further configured to execute the at least one instruction to: control the driving part such that the proceeding axis of the first driving wheel rotates by a first angle in the first direction, and the proceeding axis of the second driving wheel rotates by a second angle in the second direction opposite to the first direction, and identify the expected braking distance of the robot based on the first angle and the second angle.

The at least one processor may be further configured to execute the at least one instruction to: based on the relation between the first speed and the second speed satisfying the first condition, identify whether an expected braking distance of the robot is within a target braking distance, and based on the expected braking distance of the robot being greater than the target braking distance, control the driving part such that the first driving wheel and the second driving wheel rotate in different directions at the same speed.

According to an aspect of the disclosure, a controlling method of a robot including a driving part including a first driving wheel and a second driving wheel, includes: based on detecting an occurrence of an event for stopping the robot while the first driving wheel rotates at a first speed and the second driving wheel rotates at a second speed, controlling the driving part to stop the robot based on the first speed and the second speed, wherein the controlling the driving part to stop the robot may include: based on a relation between the first speed and the second speed satisfying a first condition, controlling the driving part such that a proceeding axis of the first driving wheel rotates in a first direction and a proceeding axis of the second driving wheel rotates in a second direction opposite to the first direction; and based on the relation between the first speed and the second speed satisfying a second condition, controlling the driving part such that the first driving wheel and the second driving wheel rotate in different directions at a same speed.

The controlling the driving part to stop the robot may further include: on an xy plane wherein an x axis indicates a rotation speed of the first driving wheel and a y axis indicates a rotation speed of the second driving wheel, calculating a first distance, a second distance, and a third distance based on a first coordinate value on a point corresponding to the first speed and the second speed: based on the first distance being greater than a sum of the second distance and the third distance, identifying that the relation between the first speed and the second speed satisfies the first condition, and based on the first distance being smaller than or equal to the sum of the second distance and the third distance, identifying that the relation between the first speed and the second speed satisfies the second condition, wherein the first distance is a distance between a first point and $y=-x$, the second distance is calculated by applying a predetermined weight to a distance between a second point wherein the first point is moved to the x axis or the y axis and adjoins $y=x$ and the first point, and the third distance is calculated by applying a predetermined weight to a distance between the second point and a starting point.

The first driving wheel is on a left side of the robot, and the second driving wheel is on a right side of the robot, and the controlling the driving part to stop the robot may further include, based on the relation between the first speed and the second speed satisfying the first condition, controlling the driving part such that the proceeding axis of the first driving wheel rotates by a first angle in a clockwise direction, and the proceeding axis of the second driving wheel rotates by a second angle in a counterclockwise direction.

The controlling the driving part to stop the robot may further include acquiring the first angle and the second angle based on the first speed and the second speed.

The controlling the driving part to stop the robot may further include: based on the relation between the first speed and the second speed satisfying the first condition, identifying whether an expected braking distance of the robot is within a target braking distance; and based on the expected braking distance of the robot being within the target braking distance, controlling the driving part such that rotation speeds of the first driving wheel and the second driving wheel decelerate.

The controlling the driving part to stop the robot may further include: controlling the driving part such that the proceeding axis of the first driving wheel rotates by a first angle in the first direction, and the proceeding axis of the second driving wheel rotates by a second angle in the second direction opposite to the first direction: and identifying the expected braking distance of the robot based on the first angle and the second angle.

The controlling the driving part to stop the robot may include: based on the relation between the first speed and the second speed satisfying the first condition, identifying whether an expected braking distance of the robot is within a target braking distance: and based on the expected braking distance of the robot being greater than the target braking distance, controlling the driving part such that the first driving wheel and the second driving wheel rotate in different directions at the same speed.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 3 is a flow chart for illustrating an operation of a robot according to an embodiment of the disclosure:

DETAILED DESCRIPTION

Figure 1A:
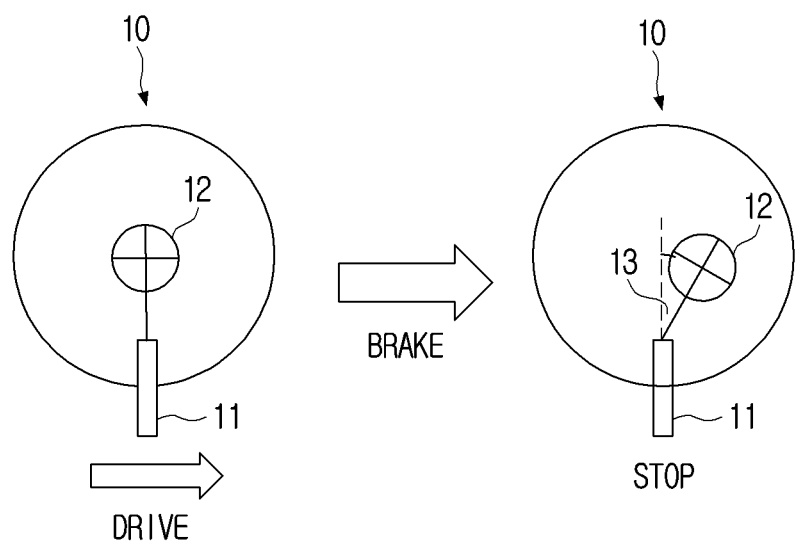
FIG. 1A to FIG. 1C are diagrams for illustrating a related art robot.

Various modifications may be made to the embodiments of the disclosure, and there may be various types of embodiments. Accordingly, embodiments will be illustrated in drawings, and the embodiments will be described in detail in the detailed description. However, it may be noted that the various embodiments are not for limiting the scope of the disclosure to an embodiment, but they may be interpreted to include various modifications, equivalents, and/or alternatives of the embodiments of the disclosure. Also, with respect to the detailed description of the drawings, similar components may be designated by similar reference numerals.

Also, in describing the disclosure, in case it is determined that detailed explanation of known functions or features may confuse the gist of the disclosure, the detailed explanation will be omitted.

In addition, the embodiments described below may be modified in various different forms, and the scope of the technical idea of the disclosure is not limited to the embodiments below. Rather, these embodiments are provided to make the disclosure more sufficient and complete, and to fully convey the technical idea of the disclosure to those skilled in the art.

Also, the terms used in the disclosure are used only to explain embodiments, and are not intended to limit the scope of the disclosure. Further, singular expressions include plural expressions, unless defined differently in the context.

In addition, in the disclosure, expressions such as "have," "may have," "include," and "may include" denote the existence of such characteristics (e.g., elements such as numbers, functions, operations, and components), and do not exclude the existence of additional characteristics.

Also, in the disclosure, the expressions "A or B," "at least one of A and/or B," or "one or more of A and/or B" and the like may include all possible combinations of the listed items. For example, "A or B," "at least one of A and B," or "at least one of A or B" may refer to all of the following cases: (1) only A, (2) only B, or (3) both A and B.

In addition, the expressions "first," "second," and the like used in the disclosure may describe various elements regardless of any order and/or degree of importance. Also, such expressions are used only to distinguish one element from another element, and are not intended to limit the elements.

As is traditional in the field, the embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. In some embodiments, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the present scope. Further, the blocks, units and/or modules of the embodiments may be physically combined into more complex blocks, units and/or modules without departing from the present scope.

The description in the disclosure that one element (e.g., a first element) is "(operatively or communicatively) coupled with/to" or "connected to" another element (e.g., a second element) may be interpreted to include both the case in which the one element is directly coupled to the another element, and the case in which the one element is coupled to the another element through still another element (e.g., a third element).

In contrast, the description that one element (e.g., a first element) is "directly coupled" or "directly connected" to another element (e.g., a second element) can be interpreted to mean that still another element (e.g., a third element) does not exist between the one element and the another element.

Also, the expression "configured to" used in the disclosure may be interchangeably used with other expressions such as "suitable for," "having the capacity to," "designed to," "adapted to," "made to," and "capable of," depending on cases. The term "configured to" does not mean that a device is "specifically designed to" in terms of hardware.

Instead, under some circumstances, the expression "a device configured to" may mean that the device "is capable of" performing an operation together with another device or component. For example, the phrase "a processor configured to perform A, B, and C" may mean a dedicated processor (e.g., an embedded processor) for performing the corresponding operations, or a generic-purpose processor (e.g., a CPU or an application processor) that can perform the corresponding operations by executing one or more software programs stored in a memory device.

Further, in the embodiments of the disclosure, 'a module' or 'a part' may perform at least one function or operation, and may be implemented as hardware or software, or as a combination of hardware and software. Also, a plurality of 'modules' or 'parts' may be integrated into at least one module and implemented as at least one processor, excluding 'a module' or 'a part' that is used as hardware.

Various elements and areas in the drawings were illustrated schematically. Accordingly, the technical idea of the disclosure is not limited by the relative sizes or intervals illustrated in the accompanying drawings.

Hereinafter, embodiments according to the disclosure will be described in detail with reference to the accompanying drawings, such that those having ordinary skill in the art to which the disclosure belongs can easily carry out the disclosure.

Figure 2A:
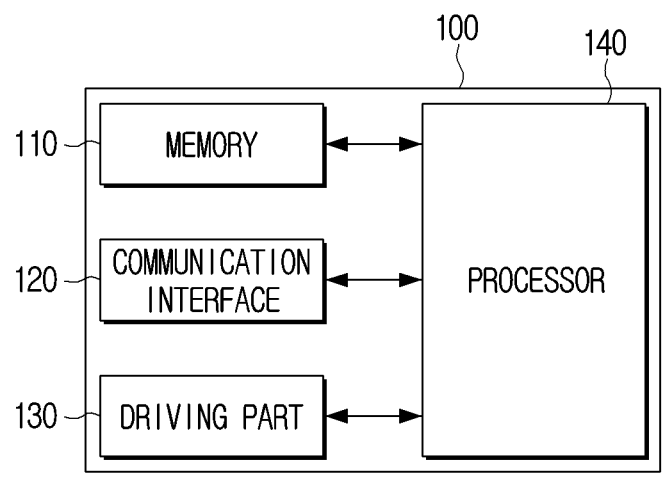
FIG. 2A is a block diagram for illustrating a configuration of a robot according to an embodiment of the disclosure.

FIG. 2A is a block diagram for illustrating a configuration of an electronic device according to an embodiment of the disclosure.

The robot 100 may include a memory 110, a communication interface 120, a driving part 130, and a processor 140. In the robot 100, some of the above components may be omitted, or other components may be further included.

Here, the robot 100 may be a driving robot controlling the balance of the robot by using an inverted pendulum, but this is merely an example, and the robot 100 may be implemented as various types of robots.

The memory 110 may store at least one instruction regarding the robot 100. Also, the memory 110 may store an operating system (O/S) for driving the robot 100. Further, the memory 110 may store various kinds of software programs or applications for the robot 100 to operate according to the various embodiments of the disclosure. Also, the memory 110 may include a semiconductor memory such as a flash memory, or a magnetic storage medium such as a hard disk, etc.

Specifically, the memory 110 may store various kinds of software modules for the robot 100 to operate according to the various embodiments of the disclosure, and the processor 140 may control the operations of the robot 100 by executing the various kinds of software modules stored in the memory 110. That is, the memory 110 may be accessed by the processor 140, and reading/recording/correction/deletion/update, etc. of data by the processor 140 may be performed.

In the disclosure, the term "memory" may be used as a meaning including the memory 110, a ROM and a RAM inside the processor 140, or a memory card (e.g., a micro SD card, a memory stick) installed on the robot 100.

Also, the communication interface 120 includes circuitry, and is a component that can communicate with an external device and a server. The communication interface 120 may perform communication with an external device or a server based on a wired or wireless communication method. The communication interface 120 may include a Bluetooth module, a Wi-Fi module, an infrared (IR) module, a local area network (LAN) module, an Ethernet module, etc. Here, each communication module may be implemented in the form of at least one hardware chip. A wireless communication module may include at least one communication chip that performs communication according to various wireless communication protocols such as Zigbee, a universal serial bus (USB), a mobile industry processor interface camera serial interface (MIPI CSI), 3rd Generation (3G), 3rd Generation Partnership Project (3GPP), Long Term Evolution (LTE), LTE Advanced (LTE-A), 4th Generation (4G), 5th Generation (5G), etc. other than the aforementioned communication methods. However, these are an example, and the communication interface 120 may use at least one communication module among various communication modules.

Figure 2B:
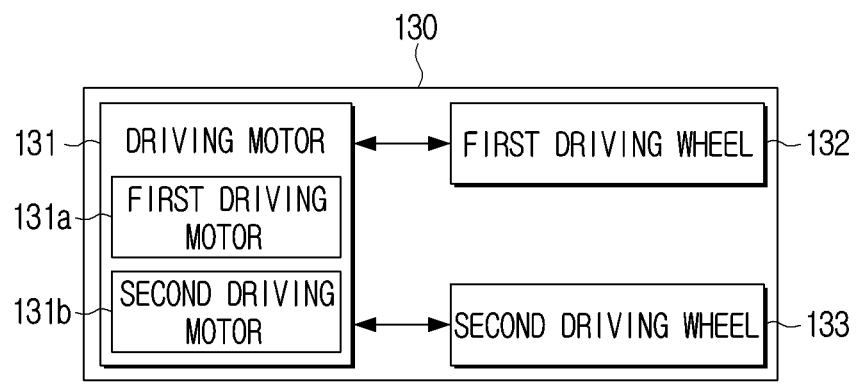
FIG. 2B is a block diagram for illustrating a configuration of a driving part according to an embodiment of the disclosure.

Referring to FIG. 2B, the driving part 130 may include a driving motor 131, a first driving wheel 132, and a second driving wheel 133, and move the robot 100.

Here, the first driving wheel 132 and the second driving wheel 133 may be provided on both ends of the bottom surface of the body of the robot 100, and the first driving wheel 132 may be provided on the left side of the robot 100 based on the front side of the robot 100 (e.g., the driving direction of the robot 100), and the second driving wheel 133 may be provided on the right side of the robot 100.

Also, the first driving wheel 132 and the second driving wheel 133 are provided with a rotational force from the driving motor 131, and move the robot 100.

The driving motor 131 generates a rotational force rotating the first driving wheel 132 and the second driving wheel 133, and may include a first driving motor 131*a* rotating the first driving wheel 132 and a second driving motor 131*b* rotating the second driving wheel 133.

The first driving motor 131*a* and the second driving motor 131*b* may respectively receive driving control signals from the processor 140 and operate independently.

By the first driving motor 131*a* and the second driving motor 131*b* that operate independently as above, the first driving wheel 132 and the second driving wheel 133 can rotate independently from each other.

Also, as the first driving wheel 132 and the second driving wheel 133 can rotate independently, the robot 100 can perform various types of driving such as forward driving, backward driving, rotative driving, and rotating in place, etc.

For example, if both the first driving wheel 132 and the second driving wheel 133 rotate in a first direction, the robot 100 may drive straight to the front side (forward driving), and if both the first driving wheel 132 and the second driving wheel 133 rotate in a second direction, the robot 100 may drive straight to the rear side (backward driving).

Also, if the first driving wheel 132 and the second driving wheel 133 rotate in the same direction, but rotate in different speeds from each other, the robot 100 may rotatably drive to the right side or the left side, and if the first driving wheel 132 and the second driving wheel 133 rotate in different directions from each other, the robot 100 may rotate in a clockwise direction or a counterclockwise direction in its place.

In addition, other than the above, the driving part 130 may further include a gear module that decelerates the rotational force of the driving motor 131 and transmits the force to the first driving wheel 132 and the second driving wheel 133, a rotation detection sensor that detects the rotational displacements and the rotation speeds of the driving motor 131 or the first driving wheel 132 and the second driving wheel 133, etc.

The processor 140 may control the overall operations and functions of the robot 100. Specifically, the processor 140 may be connected with the components of the robot 100 including the memory 110, and may control the overall operations of the robot 100 by executing the at least one instruction stored in the memory 110 as described above.

The processor 140 may be implemented by various methods. For example, the processor 140 may be implemented as at least one of an application specific integrated circuit (ASIC), a logic integrated circuit, an embedded processor, a microprocessor, a hardware control logic, a hardware finite state machine (FSM), or a digital signal processor (DSP). In the disclosure, the term "processor" may be used as a meaning including a central processing unit (CPU), a graphics processing unit (GPU), a main processing unit (MPU), etc.

In particular, the processor 140 may include at least one processor. Specifically, the at least one processor may include one or more of a central processing unit (CPU), a graphics processing unit (GPU), an accelerated processing unit (APU), a many integrated core (MIC), a digital signal processor (DSP), a neural processing unit (NPU), a hardware accelerator, or a machine learning accelerator. The at least one processor may control one or a random combination of the other components of the electronic device, and perform an operation associated with communication or data processing. Also, the at least one processor may execute one or more programs or instructions stored in the memory. For example, the at least one processor may perform the method according to an embodiment of the disclosure by executing the at least one instruction stored in the memory.

In case the method according to an embodiment of the disclosure includes a plurality of operations, the plurality of operations may be performed by one processor, or performed by a plurality of processors. That is, when a first operation, a second operation, and a third operation are performed by the method according to an embodiment, all of the first operation, the second operation, and the third operation may be performed by a first processor, or the first operation and the second operation may be performed by the first processor (e.g., a generic-purpose processor), and the third operation may be performed by a second processor (e.g., an artificial intelligence-dedicated processor).

The at least one processor may be implemented as a single core processor including one core, or it may be implemented as one or more multicore processors including a plurality of cores (e.g., multicores of the same kind or multicores of different kinds). In case the at least one processor is implemented as multicore processors, each of the plurality of cores included in the multicore processors may include an internal memory of the processor such as a cache memory, an on-chip memory, etc., and a common cache shared by the plurality of cores may be included in the multicore processors. Also, each of the plurality of cores (or some of the plurality of cores) included in the multicore processors may independently read a program instruction for implementing the method according to an embodiment of the disclosure and perform the instruction, or the plurality of entire cores (or some of the cores) may be linked with one another, and read a program instruction for implementing the method according to an embodiment of the disclosure and perform the instruction.

In case the method according to an embodiment of the disclosure includes a plurality of operations, the plurality of operations may be performed by one core among the plurality of cores included in the multicore processors, or they may be implemented by the plurality of cores. For example, when the first operation, the second operation, and the third operation are performed by the method according to an embodiment, all of the first operation, the second operation, and the third operation may be performed by a first core included in the multicore processors, or the first operation and the second operation may be performed by the first core included in the multicore processors, and the third operation may be performed by a second core included in the multicore processors.

In the embodiments of the disclosure, the processor 140 may mean a system on chip (SoC) wherein at least one processor and other electronic components are integrated, a single core processor, a multicore processor, or a core included in the single core processor or the multicore processor. Also, here, the core may be implemented as a CPU, a GPU, an APU, a MIC, a DSP, an NPU, a hardware accelerator, or a machine learning accelerator, etc., but embodiments of the disclosure are not limited thereto.

Operations of the processor 140 for implementing the various embodiments of the disclosure may be implemented through a plurality of modules.

Specifically, data regarding the plurality of modules according to the disclosure may be stored in the memory 110, and the processor 140 may access the memory 110 and load the data regarding the plurality of modules in the memory or the buffer inside the processor 140, and then implement the various embodiments according to the disclosure by using the plurality of modules.

At least one of the plurality of modules according to the disclosure may be implemented as hardware, and included inside the processor 140 in the form of a system on chip.

In some embodiments, at least one of the plurality of modules according to the disclosure may be implemented as a separate external device, and the robot 100 and each module may perform operations according to the disclosure while performing communication.

Hereinafter, operations of the processor 140 according to the disclosure will be described in detail with reference to the accompanying drawings.

Referring to FIG. 3, the processor 140 may detect occurrence of an event for stopping the robot 100 while the first driving wheel 132 rotates in the first speed and the second driving wheel 133 rotates in the second speed in operation S310. That is, the processor 140 may detect occurrence of an event for stopping the robot 100 while the robot 100 is driving.

An event for stopping the robot 100 may be an event wherein a user input for stopping the robot 100 is acquired or an event wherein an obstacle is detected in the driving direction of the robot 100, but is not limited thereto.

Also, if occurrence of an event for stopping the robot 100 is detected while the first driving wheel 132 rotates in the first speed and the second driving wheel 133 rotates in the second speed, the processor 140 may identify whether the relation between the first speed and the second speed satisfies a first condition in operation S320. Here, a method for the processor 140 to identify whether the relation between the first speed and the second speed satisfies the first condition will be described with reference to FIG. 4A and FIG. 4D.

In the xy plane illustrated in FIG. 4A to FIG. 4D, the x axis may indicate the rotation speed of the first driving wheel 132, and the y axis may indicate the rotation speed of the second driving wheel 133. Here, the processor 140 may calculate a first distance, a second distance, and a third distance based on a first coordinate value of a first point 410 corresponding to the first speed and the second speed on the xy plane. Here, the x value of the first point 410 may be the rotation speed of the first driving wheel 132, and the y value may be the rotation speed of the second driving wheel 133.

Figure 4A:
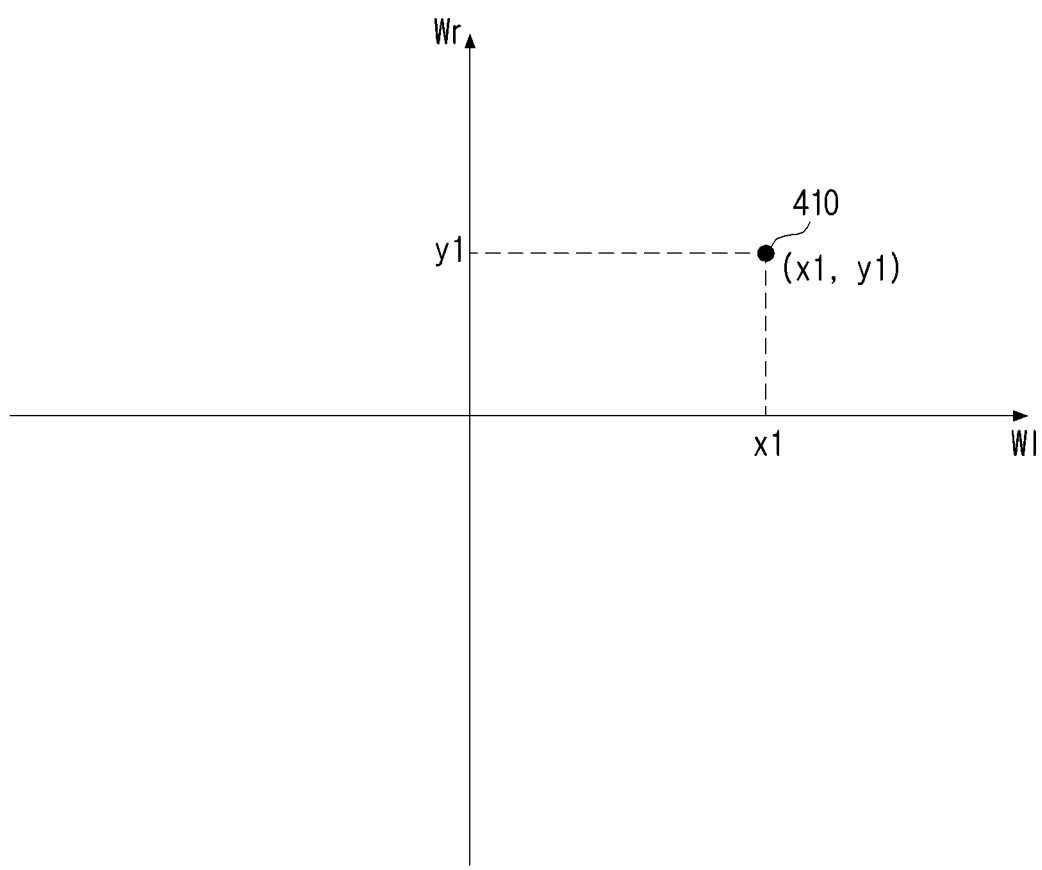
FIG. 4A to FIG. 4D are diagrams for illustrating a method for a robot to determine a relation between the first speed and the second speed according to an embodiment of the disclosure.

Referring to FIG. 4A, the first speed may be x1, and the second speed may be y1. Also, the first coordinate value of the first point 410 may be (x1, y1).

Figure 4B:
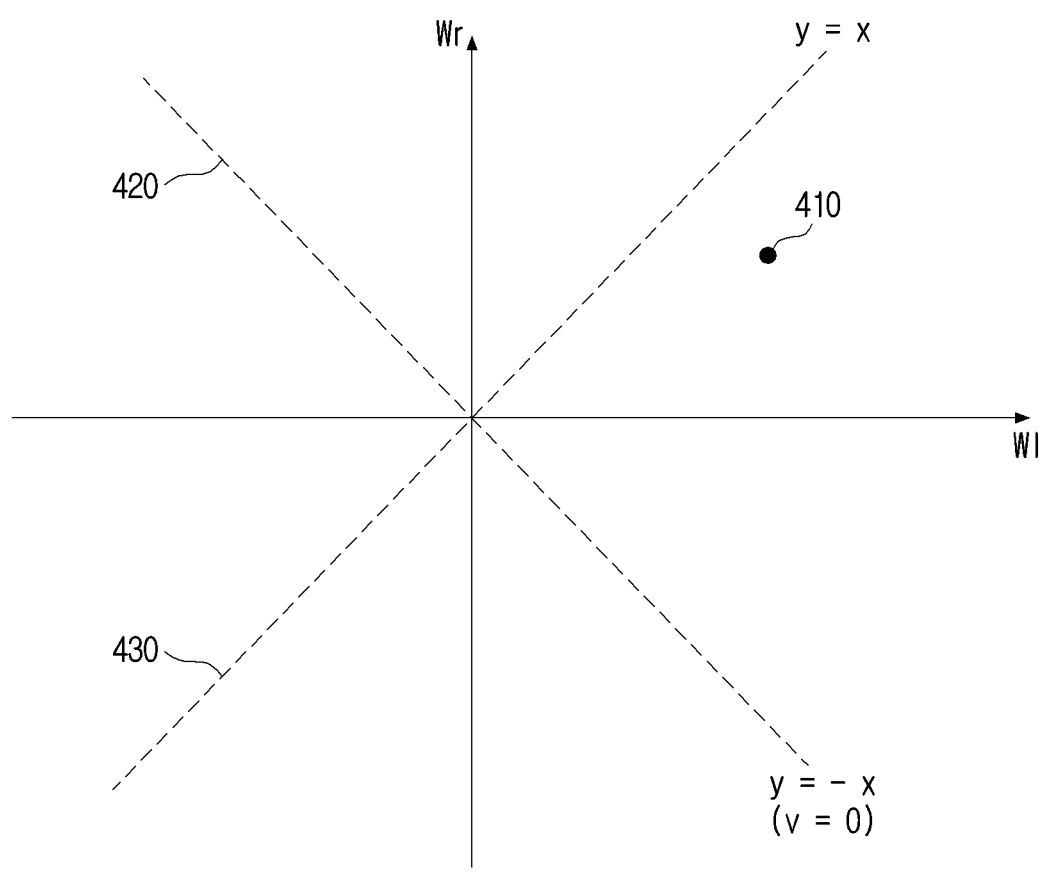

Then, as illustrated in FIG. 4B, the processor 140 may calculate the first distance, the second distance, and the third distance on the xy plane by using y=x and y=−x graphs.

Figure 4C:
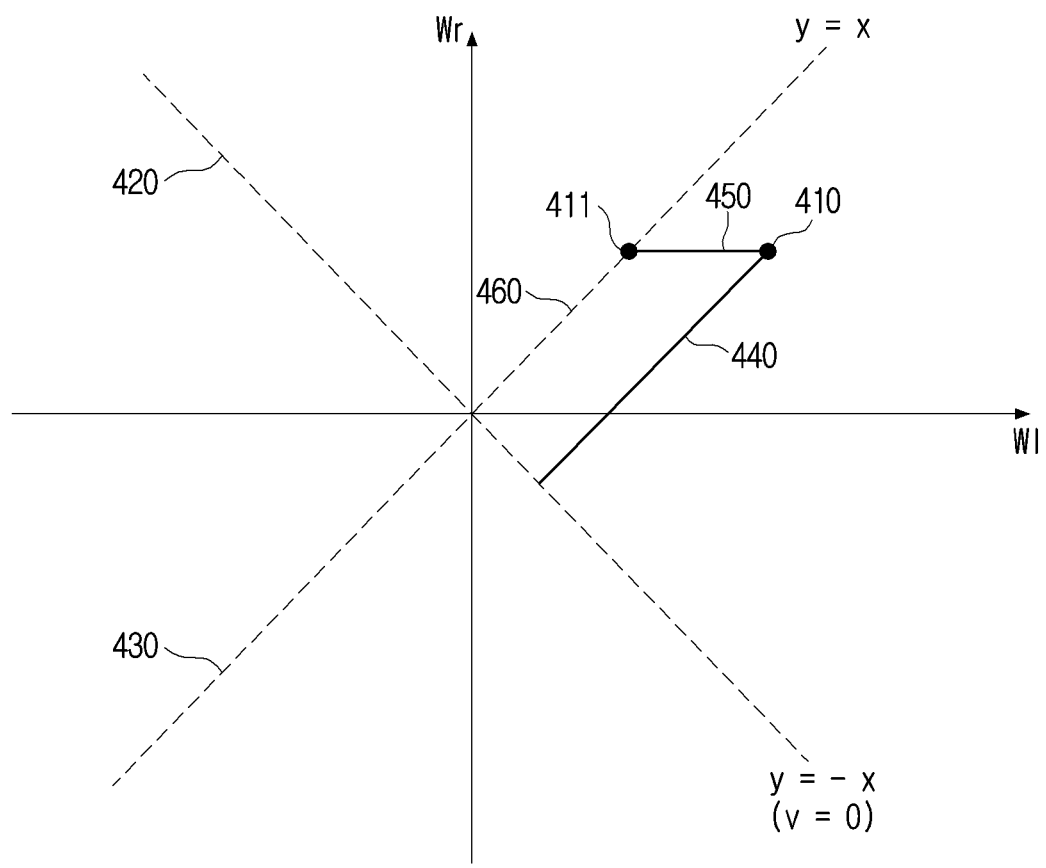

Referring to FIG. 4C, the first distance may be the distance 440 between the first point 410 and y=−x (420). Here, the first distance may be calculated by using Formula 1.

$$\text{First distance} = \frac{|x_1 + y_1|}{\sqrt{2}} \qquad \text{[Formula 1]}$$

Also, the second distance may be calculated by applying a predetermined weight to the distance 450 between a second point 411 wherein the first distance is moved to the x axis or the y axis, and adjoins y=x (430) and the first point 410. Here, a second coordinate value of the second point 411 may be (Min(x1, y1), Min(x1, y1)). Here, Min(x1, y1) may mean the minimum value from between x1 and y1. For example, if x1 is greater than or equal to y1, the second coordinate value may be (y1, y1). If y1 is smaller than x1, the second coordinate value may be (x1, x1).

Here, the second distance may be calculated by using Formula 2.

$$\text{Second distance} = \frac{|x_1 - y_1|}{c_1} \qquad \text{[Formula 2]}$$

Here, c1 may be a predetermined constant, and may be a value stored in the memory 110. Here, c1 may be a constant greater than 1.

The third distance may be calculated by applying a predetermined weight to the distance 460 between the second point 411 and the starting point. Here, the third distance may be acquired by using Formula 3.

$$\text{Third distance} = \frac{\sqrt{2}\,|\text{Min}(x_1, y_1)|}{c_2} \qquad \text{[Formula 3]}$$

Here, c2 may be a predetermined constant, and may be a value stored in the memory 110. Also, Min(x1, y1) may mean the minimum value from between x1 and y1. Here, c2 may be a constant greater than 1.

Also, in case the first distance is greater than the sum of the second distance and the third distance, the processor 140 may identify that the relation between the first speed and the second speed satisfies a first condition.

If the first distance is smaller than or equal to the sum of the second distance and the third distance, the processor 140 may identify that the relation between the first speed and the second speed satisfies a second condition.

Figure 4D:
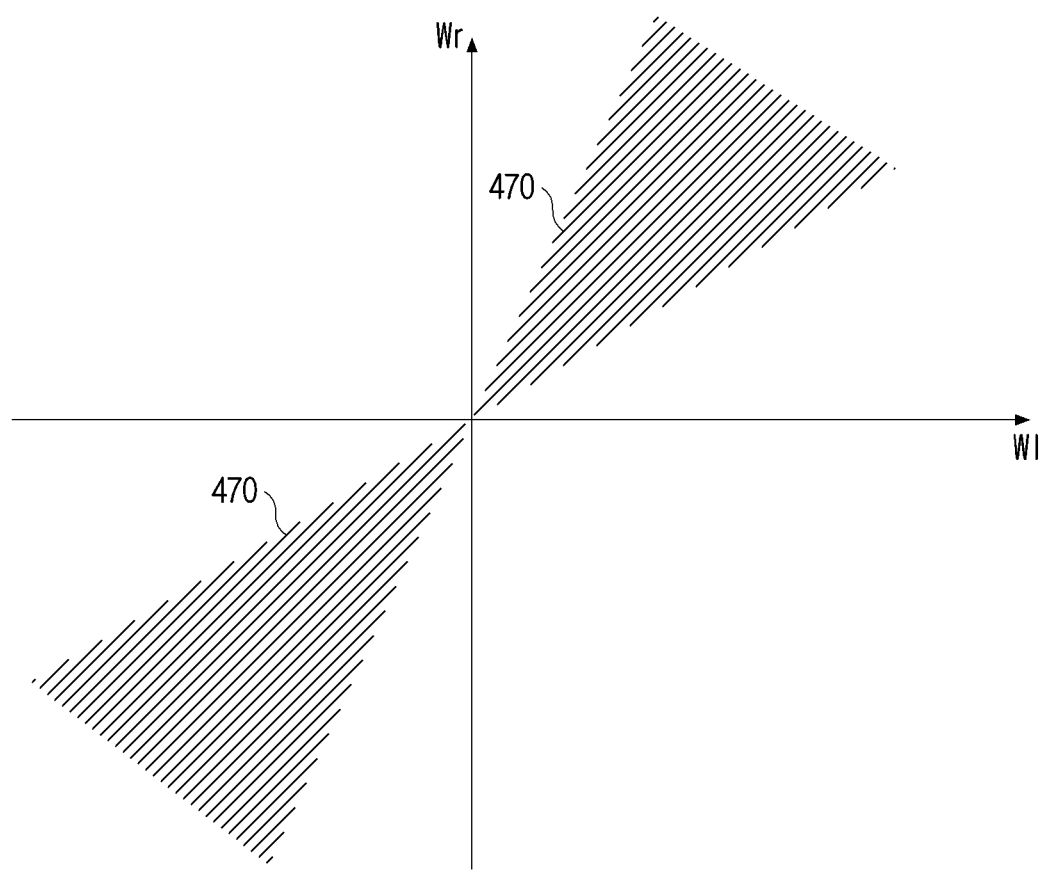

Here, referring to FIG. 4D, the coordinate value of the point corresponding to the first speed and the second speed satisfying the first condition may be a coordinate value belonging to the first area 470 on the xy plane. The coordinate value of the point corresponding to the first speed and the second speed satisfying the second condition may be a coordinate value belonging to the second area (e.g., an area that does not belong to the first area 470) on the xy plane.

According to an embodiment of the disclosure, the processor 140 may calculate the first distance, the second distance, and the third distance by using the aforementioned Formulae 1 to 3, and identify whether the relation between the first speed and the second speed satisfies the first condition or the second condition. However, this is merely an example, and the processor 140 may identify whether the relation between the first speed and the second speed satisfies the first condition or the second condition by identifying whether the first coordinate value corresponding to the first speed and the second speed belongs to the aforementioned first area or second area.

Specifically, the memory 110 may store information on the first area and the second area. Also, the processor 140 may identify whether the relation between the first speed and the second speed satisfies the first condition by using information on the first area and the second area stored in the memory 110.

If the first coordinate value corresponding to the first speed and the second speed belongs to the first area, the processor 140 may identify that the relation between the first speed and the second speed satisfies the first condition.

Also, if the first coordinate value corresponding to the first speed and the second speed belongs to the second area, the processor 140 may identify that the relation between the first speed and the second speed satisfies the second condition.

If the relation between the first speed and the second speed does not satisfy the first condition (e.g., if the relation between the first speed and the second speed satisfies the second condition) in operation S320-N, the processor 140 may control the driving part 130 such that the first driving wheel 132 and the second driving wheel 133 rotate in different directions in the same speed in operation S340. That is, if the relation between the first speed and the second speed satisfies the second condition, the processor 140 may control the driving part 130 such that the first driving wheel 132 and the second driving wheel 133 rotate in different directions in the same speed.

Figure 5A:
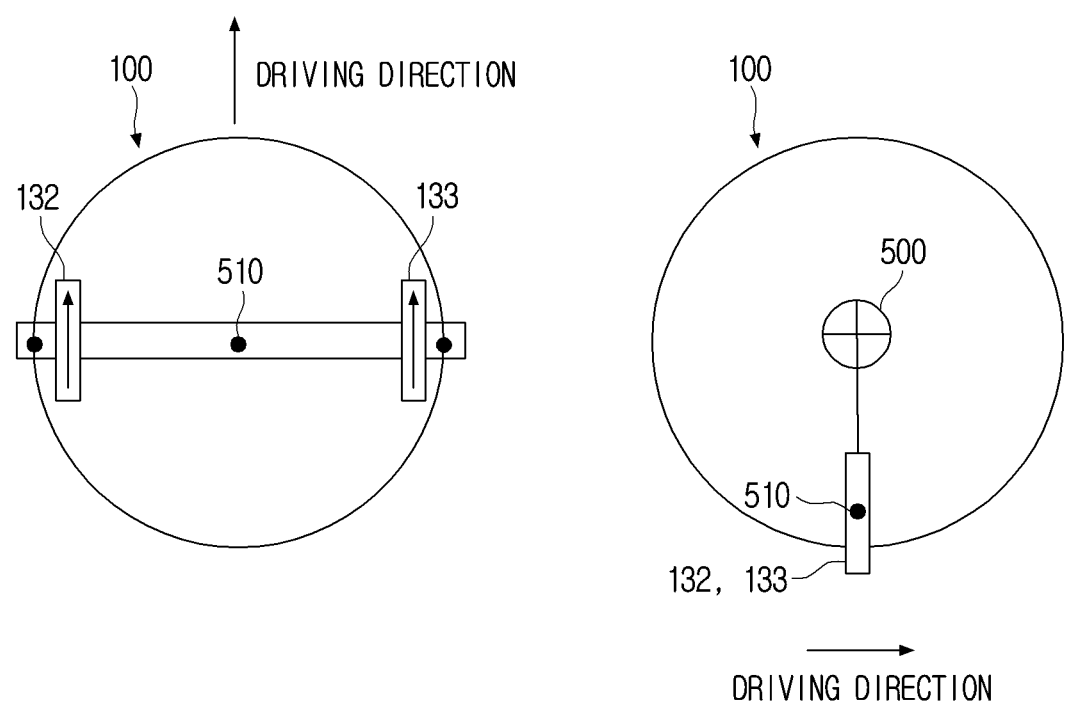
FIG. 5A to FIG. 5C are diagrams for illustrating a method for a robot to stop according to an embodiment of the disclosure.

FIG. 5A is a diagram illustrating a plan view and a perspective view of the robot 100 that is driving. Referring to FIG. 5A, the processor 140 may control the driving part 130 such that the first driving wheel 132 rotates in the first speed, and the second driving wheel 133 rotates in the second speed. Here, the rotation center 510 around which the first driving wheel 132 and the second driving wheel 133 rotate may be located in the center of the robot 100.

Here, the robot 100 may further include a pendulum 500 for detecting a pitch angle of the robot 100. Here, the pitch angle of the robot 100 may be an angle indicating the vertical direction of the robot 100 based on the ground surface. Here, the robot 100 may identify the pitch angle of the robot 100, or identify the tilt of the robot 100 by using the pendulum 500, but this embodiment is an example, and the robot 100 may identify the pitch angle of the robot 100 or the tilt of the robot 100, etc. by using a tilt sensor, etc.

Figure 5B:
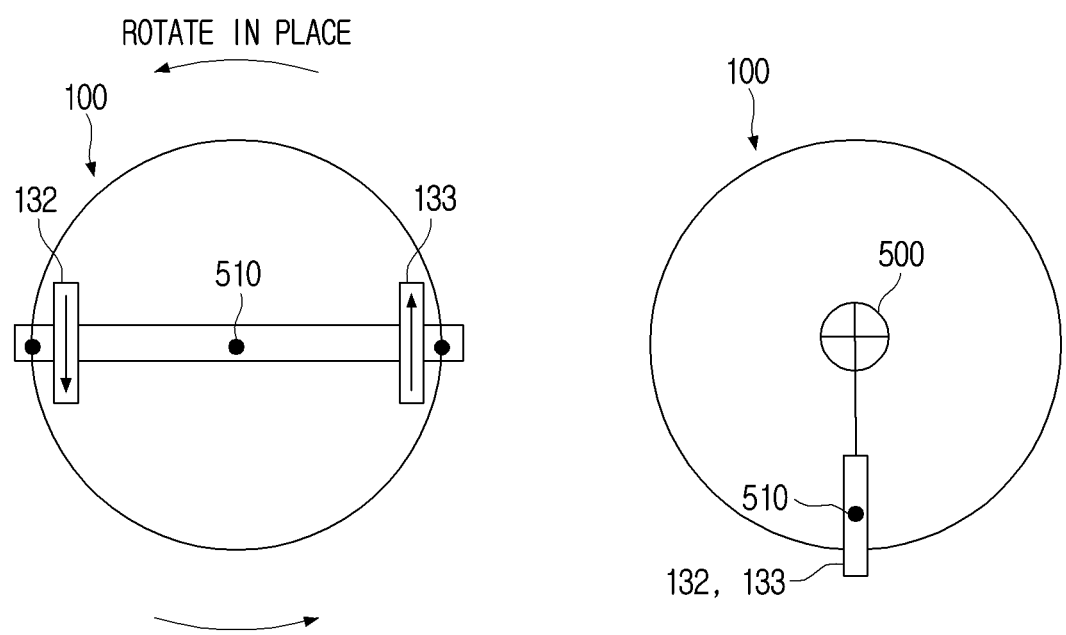

Also, if the relation between the first speed and the second speed satisfies the second condition, as illustrated in FIG. 5B, the processor 140 may control the driving part 130 such that the first driving wheel 132 and the second driving wheel 133 rotate in different directions in the same speed. That is, the processor 140 may control the driving part 130 such that the first driving wheel 132 and the second driving wheel 133 rotate in different directions in the same speed, in order that the robot 100 rotates in its place.

Then, while the robot 100 is rotating in its place, the processor 140 may stop the robot 100 by decreasing the speeds of the first driving wheel 132 and the second driving wheel 133.

If the relation between the first speed and the second speed satisfies the first condition in operation S320-Y, the processor 140 may control the driving part 130 such that the proceeding axis of the first driving wheel 132 rotates in a first direction, and the proceeding axis of the second driving wheel 133 rotates in a second direction opposite to the first direction in operation S330.

Then, if the proceeding axis of the first driving wheel 132 rotates in the first direction, and the proceeding axis of the second driving wheel 133 rotates in the second direction, the processor 140 may control the driving part 130 such that the robot 100 decelerates by decreasing the speeds of the first driving wheel 132 and the second driving wheel 133.

Here, the operation of the processor 140 of rotating the proceeding axis of the first driving wheel 132 in the first direction, and rotating the proceeding axis of the second driving wheel 133 in the second direction may be performed simultaneously with at least a part of the operation of the processor 140 of decreasing the speeds of the first driving wheel 132 and the second driving wheel 133.

Figure 5C:
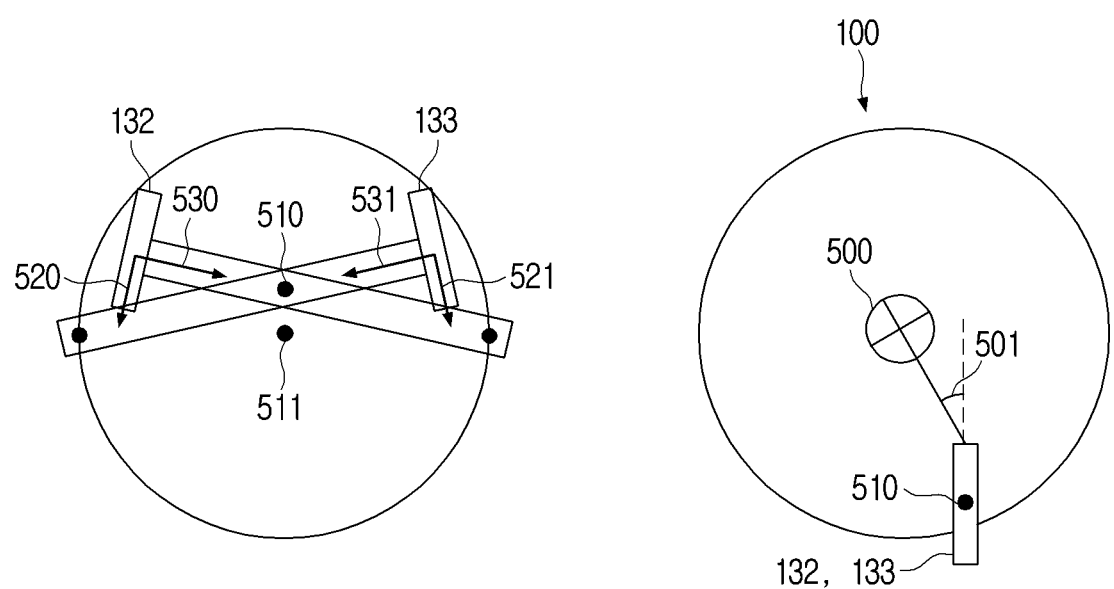

FIG. 5A to FIG. 5C are plan views and perspective views for illustrating a braking method of the robot 100. Specifically, referring to FIG. 5A, the first driving wheel 132 may be rotating in the first speed, and the second driving wheel 133 may be rotating in the second speed. Then, if the relation between the first speed and the second speed satisfies the first condition, as illustrated in FIG. 5C, the processor 140 may control the driving part 130 such that the proceeding axis of the first driving wheel 132 rotates in the first direction, and the proceeding axis of the second driving wheel 133 rotates in the second direction opposite to the first direction. Here, the processor 140 may rotate each of the first driving wheel 132 and the second driving wheel 133 as much as a predetermined angle. Also, the angles by which the first driving wheel 132 and the second driving wheel 133 are rotated in the first direction and the second direction may vary according to the rotation speeds of the first driving wheel 132 and the second driving wheel 133.

That is, the higher the rotation speeds of the first driving wheel 132 and the second driving wheel 133 are, the bigger the pitch angle generated at the time of braking of the robot 100 may be. In this case, to compensate the bigger pitch angle, the angles by which the first driving wheel 132 and the second driving wheel 133 are rotated in the first direction and the second direction may become bigger.

Here, the first driving wheel 132 and the second driving wheel 133 may respectively rotate in the first direction and the second direction, and the rotation center 510 of the first driving wheel 132 and the second driving wheel 133 may move more forward than the rotation center 510 of the robot 100. Accordingly, the pitch angle 501 of the robot 100 may change in the direction of (-). In some embodiments, the robot 100 may be tilted in an opposite direction to the driving direction.

Figure 1B:
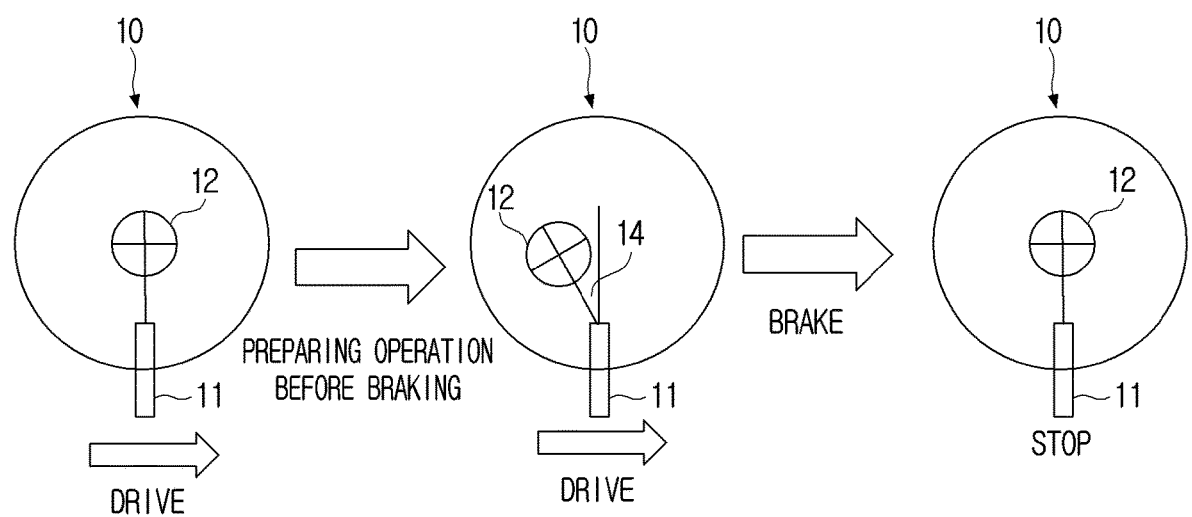

That is, unlike in the related art robot 10 illustrated in FIG. 1A and FIG. 1B, in the robot 100 according to the disclosure, a braking preparing operation of the robot 100 of rotating or moving the body of the robot 100 through a preparing operation before braking may be omitted. Accordingly, compared to the related art robot 10, the robot 100 according to the disclosure can reduce the braking distance and the braking time at the time of braking.

Figure 1C:
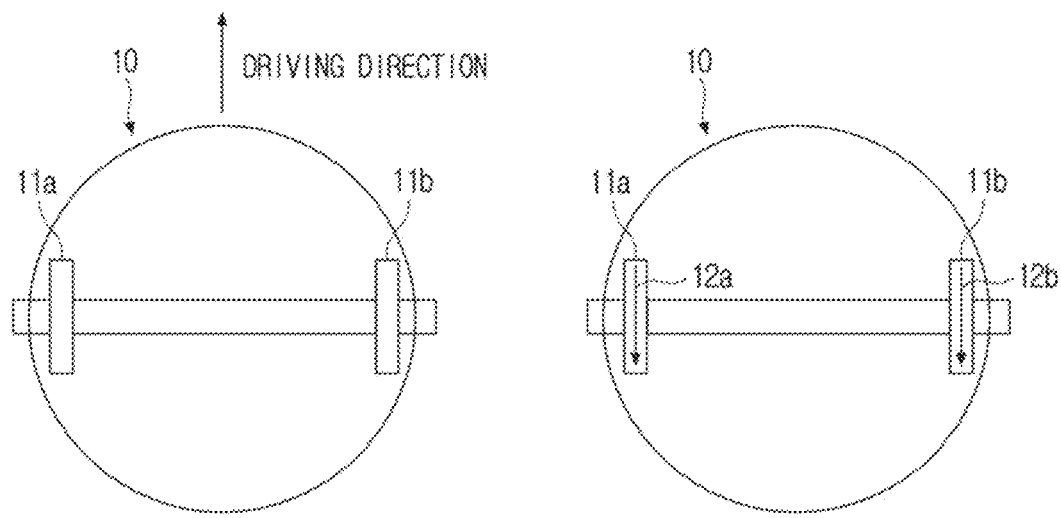

Also, the forces for decelerating the first driving wheel 132 and the second driving wheel 133 of the robot 100 according to the disclosure may include a first parallel force 520 and a second parallel force 521 that are in parallel to the proceeding axes of the first driving wheel 132 and the second driving wheel 133 and a first lateral force 530 and a second lateral force 531 that are toward the rotation center 510 in first driving wheel 132 and the second driving wheel 133. That is, the related art robot 10 illustrated in FIG. 1C had to decelerate or stop the related art robot 10 by using only the force parallel to the proceeding axis of the driving wheel 11 in the driving wheel 11, and accordingly, there was a problem that the braking distance and the braking time increased.

Compared to the related art robot 10, the robot 100 according to the disclosure has an effect of being able to further increase the braking force for braking the robot 100 by additionally using the first lateral force 530 and a second lateral force 531 that are toward the rotation center 510 in first driving wheel 132 and the second driving wheel 133. Accordingly, the robot 100 according to the disclosure has an effect that the braking distance and the braking time further decrease.

Then, the processor 140 may identify whether an expected braking distance of the robot 100 is within a target braking distance in operation S350.

Here, based on the angles by which the first driving wheel 132 and the second driving wheel 133 rotated, the processor 140 may identify the expected braking distance of the robot 100.

Specifically, the processor 140 may calculate the acceleration of the robot 100 by using the angles by which the first driving wheel 132 and the second driving wheel 133 rotated and the rotation speeds of the first driving wheel 132 and the second driving wheel 133.

Then, by using the calculated acceleration, the processor 140 may identify the expected braking distance of the robot 100 in a state wherein the first driving wheel 132 and the second driving wheel 133 respectively rotated in the first direction and the second direction.

If the expected braking distance is smaller than or equal to the target braking distance in operation S350-Y, the processor 140 may stop the robot 100 in operation S360. Specifically, if the expected braking distance is smaller than or equal to the target braking distance, the processor 140 may stop the robot 100 by decelerating the rotation speeds of the first driving wheel 132 and the second driving wheel 133.

That is, in a state wherein the proceeding axis of the first driving wheel 132 is rotated in the first direction, and the proceeding axis of the second driving wheel 133 is rotated in the second direction, the processor 140 may control the driving part 130 such that the rotation speed of the first driving wheel 132 and the rotation speed of the second driving wheel 133 become 0.

If the expected braking distance is greater than the target braking distance in operation S350-N, the processor 140 may control the driving part 130 such that the first driving wheel 132 and the second driving wheel 133 rotate in different directions in the same speed. Then, if the first driving wheel 132 and the second driving wheel 133 rotate in different directions in the same speed, the processor 140 may control the driving part 130 such that the rotation speeds of the first driving wheel 132 and the second driving wheel 133 become 0.

Accordingly, the processor 140 may control the driving part 130 such that the robot 100 rotates in its place and then stops, and may thereby stop the robot 100 within the target braking distance.

Figure 6:
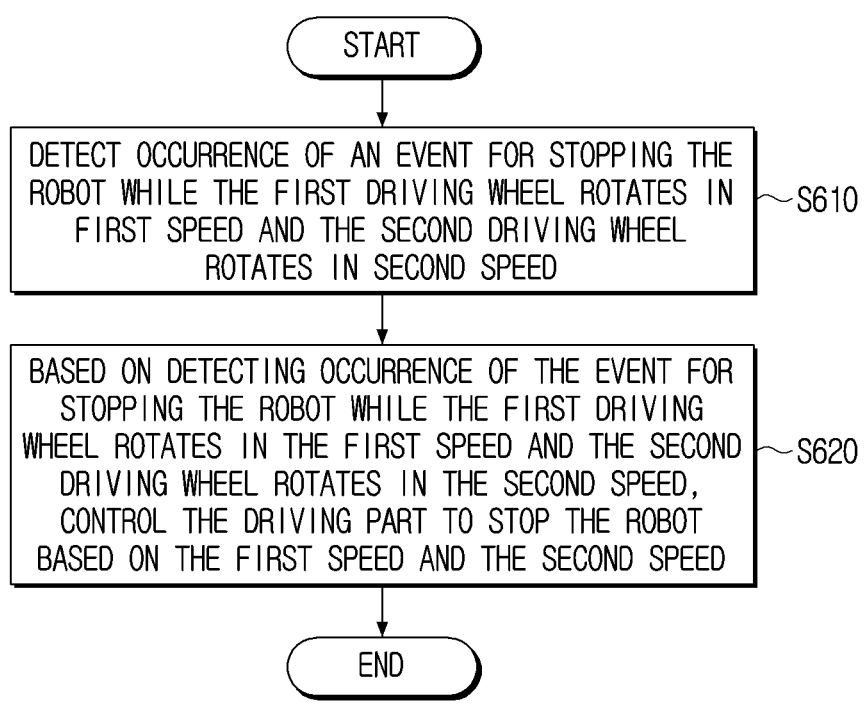
FIG. 6 is a diagram for illustrating a controlling method of a robot according to an embodiment of the disclosure.

FIG. 6 is a diagram for illustrating a controlling method of the robot 100 according to an embodiment of the disclosure.

While the first driving wheel 132 rotates in the first speed and the second driving wheel 133 rotates in the second speed, the robot 100 may detect occurrence of an event for stopping the robot 100 in operation S610.

Then, if an event for stopping the robot 100 is detected while the first driving wheel 132 rotates in the first speed and the second driving wheel 133 rotates in the second speed, the robot 100 may control the driving part 130 to stop the robot 100 based on the first speed and the second speed in operation S620.

Here, in case the relation between the first speed and the second speed satisfies a first condition, the processor 140 may control the driving part 130 such that the proceeding axis of the first driving wheel 132 rotates in a first direction and the proceeding axis of the second driving wheel 133 rotates in a second direction opposite to the first direction.

Here, the first driving wheel 132 may be located on the left side of the robot 100, and the second driving wheel 133 may be located on the right side of the robot 100.

Then, in case the relation between the first speed and the second speed satisfies the first condition, the processor 140 may control the driving part 130 such that the proceeding axis of the first driving wheel 132 rotates by a first angle in a clockwise direction, and the proceeding axis of the second driving wheel 133 rotates by a second angle in a counterclockwise direction.

Here, based on the first speed and the second speed (or, based on the driving speed of the robot 100), the processor 140 may acquire the first angle and the second angle.

Then, in case the relation between the first speed and the second speed satisfies the first condition, the processor 140 may identify whether an expected braking distance of the robot 100 is within a target braking distance. If the expected braking distance of the robot 100 is within the target braking distance, the processor 140 may control the driving part 130 such that the rotation speeds of the first driving wheel 132 and the second driving wheel 133 decelerate.

Here, the processor 140 may identify the expected braking distance of the robot 100 based on the first angle and the second angle.

Then, in case the relation between the first speed and the second speed satisfies the first condition, the processor 140 may identify whether the expected braking distance of the robot 100 is within the target braking distance. Then, if the expected braking distance of the robot 100 is greater than the target braking distance, the processor 140 may control the driving part 130 such that the first driving wheel 132 and the second driving wheel 133 rotate in different directions in the same speed.

Then, in case the relation between the first speed and the second speed satisfies a second condition, the processor 140 may control the driving part 130 such that the first driving wheel 132 and the second driving wheel 133 rotate in different directions in the same speed.

Specifically, on an xy plane wherein an x axis indicates the rotation speed of the first driving wheel, and a y axis indicates the rotation speed of the second driving wheel, the processor 140 may calculate a first distance 440, a second distance 450, and a third distance 460 based on a first coordinate value on a point corresponding to the first speed and the second speed. Then, in case the first distance 440 is greater than a sum of the second distance 450 and the third distance 460, the processor 140 may identify that the relation between the first speed and the second speed satisfies the first condition, and in case the first distance 440 is smaller than or equal to the sum of the second distance 450 and the third distance 460, the processor 140 may identify that the relation between the first speed and the second speed satisfies the second condition.

Here, the first distance 440 may be a distance between the first point and y=−x, and the second distance 450 may be calculated by applying a predetermined weight to a distance between a second point wherein the first point is moved to the x axis or the y axis and adjoins y=x and the first point, and the third distance 460 may be calculated by applying a predetermined weight to a distance between the second point and the starting point.

The term "a part" or "a module" used in the disclosure may include a unit implemented as hardware, software, or firmware, and may be interchangeably used with, for example, terms such as a logic, a logical block, a component, or a circuit. In addition, "a part" or "a module" may be a component constituted as an integrated body or a minimum unit or a part thereof performing one or more functions. For example, a module may be constituted as an application-specific integrated circuit (ASIC).

Also, the various embodiments of the disclosure may be implemented as software including instructions stored in machine-readable storage media, which can be read by machines (e.g., computers). The machines refer to devices that call instructions stored in a storage medium, and can operate according to the called instructions, and the devices may include the robot 100 according to the aforementioned embodiments. In case an instruction is executed by a processor, the processor may perform a function corresponding to the instruction by itself, or by using other components under its control. An instruction may include a code that is generated or executed by a compiler or an interpreter. A storage medium that is readable by machines may be provided in the form of a non-transitory storage medium. Here, the term 'non-transitory' only means that a storage medium does not include signals, and is tangible, but does not indicate whether data is stored in the storage medium semi-permanently or temporarily.

In addition, according to an embodiment, the method according to the various embodiments described in the disclosure may be provided while being included in a computer program product. A computer program product refers to a product, and it can be traded between a seller and a buyer. A computer program product can be distributed in the form of a storage medium that is readable by machines (e.g., a compact disc read only memory (CD-ROM)), or may be distributed on-line through an application store (e.g., Play Store™). In the case of on-line distribution, at least a portion of a computer program product may be stored in a storage medium such as the server of the manufacturer, the server of the application store, and the memory of the relay server at least temporarily, or may be generated temporarily.

Further, each of the components (e.g., a module or a program) according to the various embodiments may consist of a singular object or a plurality of objects. In addition, among the aforementioned corresponding sub components, some sub components may be omitted, or other sub components may be further included in the various embodiments. In some embodiments, some components (e.g., a module or a program) may be integrated as an object, and perform functions that were performed by each of the components before integration identically or in a similar manner. Also, operations performed by a module, a program, or other components according to the various embodiments may be executed sequentially, in parallel, repetitively, or heuristically. Or, at least some of the operations may be executed in a different order or omitted, or other operations may be added.

What is claimed is:

1. A robot comprising:
   a driving part comprising a first driving wheel and a second driving wheel;
   a memory storing at least one instruction; and
   at least one processor operatively coupled with the driving part and the memory,
   wherein the at least one processor is configured to execute the at least one instruction to:
   based on detecting an occurrence of an event for stopping the robot while the first driving wheel rotates at a first speed and the second driving wheel rotates at a second speed, control the driving part to stop the robot based on the first speed and the second speed, and
   wherein the at least one processor is further configured to execute the at least one instruction to control the driving part to stop the robot by:
   based on a relation between the first speed and the second speed satisfying a first condition, controlling the driving part such that a proceeding axis of the first driving wheel rotates in a first direction and a proceeding axis of the second driving wheel rotates in a second direction opposite to the first direction, and
   based on the relation between the first speed and the second speed satisfying a second condition, controlling the driving part such that the first driving wheel and the second driving wheel rotate in different directions at a same speed.

2. The robot of claim 1, wherein the at least one processor is further configured to execute the at least one instruction to:
   on an xy plane wherein an x axis indicates a rotation speed of the first driving wheel and a y axis indicates a rotation speed of the second driving wheel, calculate a first distance, a second distance, and a third distance based on a first coordinate value of a first point corresponding to the first speed and the second speed,
   based on the first distance being greater than a sum of the second distance and the third distance, identify that the relation between the first speed and the second speed satisfies the first condition, and
   based on the first distance being smaller than or equal to the sum of the second distance and the third distance, identify that the relation between the first speed and the second speed satisfies the second condition, wherein the first distance is a distance between the first point and y=−x, wherein the second distance is calculated by applying a predetermined weight to a distance between a second point wherein the first point is moved to the x axis or the y axis and adjoins y=x and the first point, and wherein the third distance is calculated by applying a predetermined weight to a distance between the second point and an origin point.

3. The robot of claim 1, wherein the first driving wheel is on a left side of the robot, and the second driving wheel is on a right side of the robot, and wherein the at least one processor is further configured to execute the at least one instruction to:

based on the relation between the first speed and the second speed satisfying the first condition, control the driving part such that the proceeding axis of the first driving wheel rotates by a first angle in a clockwise direction, and the proceeding axis of the second driving wheel rotates by a second angle in a counterclockwise direction.

4. The robot of claim 3, wherein the at least one processor is further configured to execute the at least one instruction to:

acquire the first angle and the second angle based on the first speed and the second speed.

5. The robot of claim 1, wherein the at least one processor is further configured to execute the at least one instruction to:

based on the relation between the first speed and the second speed satisfying the first condition, identify whether an expected braking distance of the robot is within a target braking distance, and based on the expected braking distance of the robot being within the target braking distance, control the driving part such that rotation speeds of the first driving wheel and the second driving wheel decelerate.

6. The robot of claim 5, wherein the at least one processor is further configured to execute the at least one instruction to:

control the driving part such that the proceeding axis of the first driving wheel rotates by a first angle in the first direction, and the proceeding axis of the second driving wheel rotates by a second angle in the second direction opposite to the first direction, and identify the expected braking distance of the robot based on the first angle and the second angle.

7. The robot of claim 1, wherein the at least one processor is further configured to execute the at least one instruction to:

based on the relation between the first speed and the second speed satisfying the first condition, identify whether an expected braking distance of the robot is within a target braking distance, and based on the expected braking distance of the robot being greater than the target braking distance, control the driving part such that the first driving wheel and the second driving wheel rotate in different directions at the same speed.

8. A controlling method of a robot comprising a driving part comprising a first driving wheel and a second driving wheel, the controlling method comprising:

based on detecting an occurrence of an event for stopping the robot while the first driving wheel rotates at a first speed and the second driving wheel rotates at a second speed, controlling the driving part to stop the robot based on the first speed and the second speed, wherein the controlling the driving part to stop the robot comprises:

based on a relation between the first speed and the second speed satisfying a first condition, controlling the driving part such that a proceeding axis of the first driving wheel rotates in a first direction and a proceeding axis of the second driving wheel rotates in a second direction opposite to the first direction; and based on a relation between the first speed and the second speed satisfying a second condition, controlling the driving part such that the first driving wheel and the second driving wheel rotate in different directions at a same speed.

9. The controlling method of claim 8, wherein controlling the driving part to stop the robot further comprises:

on an xy plane wherein an x axis indicates a rotation speed of the first driving wheel and a y axis indicates a rotation speed of the second driving wheel, calculating a first distance, a second distance, and a third distance based on a first coordinate value of a first point corresponding to the first speed and the second speed;

based on the first distance being greater than a sum of the second distance and the third distance, identifying that the relation between the first speed and the second speed satisfies the first condition, and based on the first distance being smaller than or equal to the sum of the second distance and the third distance, identifying that the relation between the first speed and the second speed satisfies the second condition, wherein the first distance is a distance between the first point and y=−x, wherein the second distance is calculated by applying a predetermined weight to a distance between a second point wherein the first point is moved to the x axis or the y axis and adjoins y=x and the first point, and wherein the third distance is calculated by applying a predetermined weight to a distance between the second point and an origin point.

10. The controlling method of claim 8, wherein the first driving wheel is on a left side of the robot, and the second driving wheel is on a right side of the robot, and wherein the controlling the driving part to stop the robot further comprises:

based on the relation between the first speed and the second speed satisfying the first condition, controlling the driving part such that the proceeding axis of the first driving wheel rotates by a first angle in a clockwise direction, and the proceeding axis of the second driving wheel rotates by a second angle in a counterclockwise direction.

11. The controlling method of claim 10, wherein the controlling the driving part to stop the robot further comprises:

acquiring the first angle and the second angle based on the first speed and the second speed.

12. The controlling method of claim 8, wherein the controlling the driving part to stop the robot further comprises:

based on the relation between the first speed and the second speed satisfying the first condition, identifying whether an expected braking distance of the robot is within a target braking distance; and based on the expected braking distance of the robot being within the target braking distance, controlling the driving part such that rotation speeds of the first driving wheel and the second driving wheel decelerate.

13. The controlling method of claim 12, wherein the controlling the driving part to stop the robot further comprises:
controlling the driving part such that the proceeding axis of the first driving wheel rotates by a first angle in the first direction, and the proceeding axis of the second driving wheel rotates by a second angle in the second direction opposite to the first direction; and
identifying the expected braking distance of the robot based on the first angle and the second angle.

14. The controlling method of claim 8, wherein the controlling the driving part to stop the robot further comprises:
based on the relation between the first speed and the second speed satisfying the first condition, identifying whether an expected braking distance of the robot is within a target braking distance; and
based on the expected braking distance of the robot being greater than the target braking distance, controlling the driving part such that the first driving wheel and the second driving wheel rotate in different directions at the same speed.

15. A non-transitory computer-readable recording medium storing a program that is executable by a processor to perform a controlling method of a robot comprising a driving part comprising a first driving wheel and a second driving wheel, the controlling method comprising:
based on detecting an occurrence of an event for stopping the robot while the first driving wheel rotates at a first speed and the second driving wheel rotates at a second speed, controlling the driving part to stop the robot based on the first speed and the second speed,
wherein the controlling the driving part to stop the robot comprises:
based on a relation between the first speed and the second speed satisfying a first condition, controlling the driving part such that a proceeding axis of the first driving wheel rotates in a first direction and a proceeding axis of the second driving wheel rotates in a second direction opposite to the first direction; and
based on the relation between the first speed and the second speed satisfying a second condition, controlling the driving part such that the first driving wheel and the second driving wheel rotate in different directions at a same speed.

16. The non-transitory computer-readable recording medium of claim 15,
wherein the controlling the driving part to stop the robot further comprises:
on an xy plane wherein an x axis indicates a rotation speed of the first driving wheel and a y axis indicates a rotation speed of the second driving wheel, calculating a first distance, a second distance, and a third distance based on a first coordinate value of a first point corresponding to the first speed and the second speed;
based on the first distance being greater than a sum of the second distance and the third distance, identifying that the relation between the first speed and the second speed satisfies the first condition, and
based on the first distance being smaller than or equal to the sum of the second distance and the third distance, identifying that the relation between the first speed and the second speed satisfies the second condition,
wherein the first distance is a distance between the first point and y=−x,
wherein the second distance is calculated by applying a predetermined weight to a distance between a second point wherein the first point is moved to the x axis or the y axis and adjoins y=x and the first point, and
wherein the third distance is calculated by applying a predetermined weight to a distance between the second point and an origin point.

17. The non-transitory computer-readable recording medium of claim 15,
wherein the first driving wheel is on a left side of the robot, and the second driving wheel is on a right side of the robot, and
wherein the controlling the driving part to stop the robot further comprises:
based on the relation between the first speed and the second speed satisfying the first condition, controlling the driving part such that the proceeding axis of the first driving wheel rotates by a first angle in a clockwise direction, and the proceeding axis of the second driving wheel rotates by a second angle in a counterclockwise direction.

18. The non-transitory computer-readable recording medium of claim 17,
wherein the controlling the driving part to stop the robot further comprises:
acquiring the first angle and the second angle based on the first speed and the second speed.

19. The non-transitory computer-readable recording medium of claim 15,
wherein the controlling the driving part to stop the robot further comprises:
based on the relation between the first speed and the second speed satisfying the first condition, identifying whether an expected braking distance of the robot is within a target braking distance; and
based on the expected braking distance of the robot being within the target braking distance, controlling the driving part such that rotation speeds of the first driving wheel and the second driving wheel decelerate.

20. The non-transitory computer-readable recording medium of claim 19,
wherein the controlling the driving part to stop the robot further comprises:
controlling the driving part such that the proceeding axis of the first driving wheel rotates by a first angle in the first direction, and the proceeding axis of the second driving wheel rotates by a second angle in the second direction opposite to the first direction; and
identifying the expected braking distance of the robot based on the first angle and the second angle.

* * * * *